United States Patent [19]

Kuno

[11] Patent Number: 5,442,743
[45] Date of Patent: Aug. 15, 1995

[54] ELECTRONIC DEVICE FOR CALCULATING AND DISPLAYING A MATRIX

[75] Inventor: Michiaki Kuno, Yamatokoriyama, Japan

[73] Assignee: Sharp Kabushiki Kaisha, Osaka, Japan

[21] Appl. No.: 908,257

[22] Filed: Jul. 6, 1992

[30] Foreign Application Priority Data

Jul. 8, 1991 [JP] Japan .................... 3-167198

[51] Int. Cl.⁶ ............................................. G06F 15/00
[52] U.S. Cl. ................................................. 395/148
[58] Field of Search ................ 395/145, 148, 149; 345/149, 171, 172

[56] References Cited

FOREIGN PATENT DOCUMENTS 62-242265 10/1987 Japan .
63-36475 2/1988 Japan .
63-36476 2/1988 Japan .
63-36477 2/1988 Japan .
63-61326 3/1988 Japan .
63-103363 5/1988 Japan .
3-30053 2/1991 Japan .

OTHER PUBLICATIONS

"WordPerfect for Windows", Simpson, pp. 754-770, 1993.

Primary Examiner—Phu K. Nguyen
Attorney, Agent, or Firm—Nixon & Vanderhye

[57] ABSTRACT

An electronic device for calculating and displaying a matrix of the invention includes a display having a screen portion for displaying a matrix, and a keyboard by which commands are input into a CPU. After receiving a matrix generating command from the keyboard, the CPU controls a display of the matrix in a row-column format in which each element of the matrix has an initial value. The CPU further receives values of elements of the matrix from the keyboard. One of the elements the value of which is to be changed is designated by a cursor on the screen portion.

14 Claims, 7 Drawing Sheets

A [1,1]/[3, 3]
DIM A [3, 3] =
$$\begin{bmatrix} 123, & 234, & 345 \\ 23, & 4, & 5 \\ 345, & 56, & 678 \end{bmatrix}$$
6

FIG. 3

A [1, 1]/[3, 3]
MAT A =
$$\begin{bmatrix} \boxed{123}, & 234, & 345 \\ 23, & 4, & 5 \\ 345, & 56, & 678 \end{bmatrix}$$

FIG. 4

A [3, 3]/[6, 6]
$$\begin{bmatrix} 123, & 234, & 345, & 12 \\ 234, & 345, & 456, & 56 \\ 567, & 345, & 789, & 23 \\ 123, & 298, & 876, & 76 \end{bmatrix} \rightarrow$$
6

FIG. 5

A [3, 3]/[6, 6]
$$\begin{bmatrix} 345, & 456, & 567, & 78 \\ 345, & \boxed{789}, & 232, & 32 \\ 298, & 876, & 766, & 54 \\ 111, & 222, & 333, & 44 \end{bmatrix} \rightarrow$$

$1+ \begin{bmatrix} 2, & 3 \\ 4, & 5 \end{bmatrix}$ ⌒—6

[ ] END

FIG. 13

$1+ \begin{bmatrix} 2, & 3 \\ 4, & 5 \end{bmatrix} *6=$ $\begin{bmatrix} 13, & 19 \\ 25, & 31 \end{bmatrix}$

[ ] END

FIG. 14

MAT [1, 1]/[2, 2]

6—⌒ $1+ \begin{bmatrix} 2, & 3 \\ 4, & 5 \end{bmatrix} *6=$

END

FIG. 15

MAT [1, 1]/[2, 2]
$\lfloor 4, 5 \rfloor$ $\begin{bmatrix} \boxed{13}, & 19 \\ 25, & 31 \end{bmatrix}$

[ ] END

FIG. 16
(PRIOR ART)

```
MAT A
A(1, 1) =
                    341.
A(2, 1) =
                    12.3
```
60

FIG. 17
(PRIOR ART)

$$1 + \text{MAT A} * 6 = \begin{bmatrix} 13, & 19 \\ 25, & 31 \end{bmatrix}$$

60

ELECTRONIC DEVICE FOR CALCULATING AND DISPLAYING A MATRIX

BACKGROUND OF THE INVENTION

1. Field of the Invention

The present invention relates to an electronic device such as a personal computer which functions to calculate and display a matrix. More particularly, the present invention relates to an electronic device which can display a matrix in a row-column format as generally written in ordinary text books.

2. Description of the Prior Art

Figure 16:
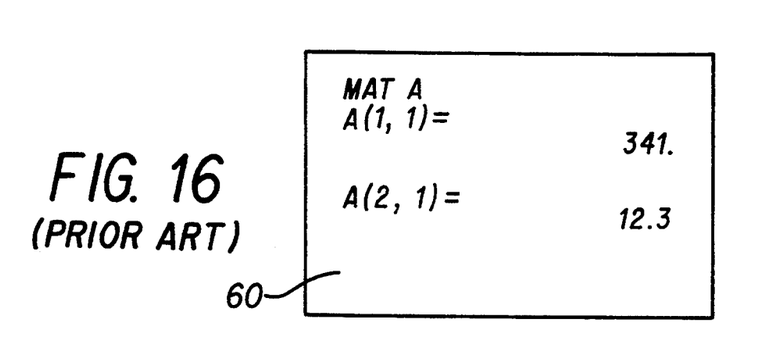
FIG. 16 illustrates an example of a conventional format of a matrix displayed on a screen portion in a prior art.

In order to calculate and display a matrix, an operator must first input each value of the elements of the matrix to such an electronic device. FIG. 16 shows one example of a conventional format of a matrix displayed on a screen portion 60 of a display apparatus, during an input operation for inputting each value of the elements of the matrix by an operator. As shown in FIG. 16, the electronic device displays "MAT A" indicative of a matrix A according to the input operation. In this example, "341." is input as a value of a first-row and first-column element of the matrix A denoted by "A(1, 1)". "12.3" is input as a value of a second-row and first-column element of the matrix A denoted by "A(2, 1)".

During the input operation, the matrix A is displayed in the conventional format, as shown in FIG. 16. However, the calculated result of the matrix A is displayed in the row-column format, as given by Expression (1).

$$= \begin{bmatrix} a, b \\ c, d \end{bmatrix} \quad (1)$$

Figure 17:
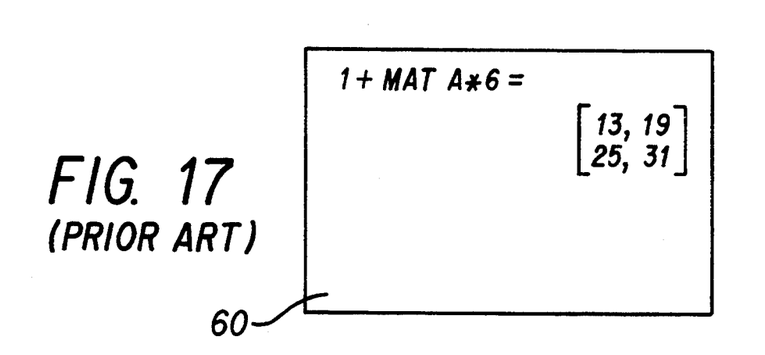
FIG. 17 illustrates an example of a mixed expression and the evaluated result displayed on the screen portion in the prior art.

FIG. 17 shows an exemplary expression including the matrix A displayed on the screen portion 60 (hereinafter, such an expression including a matrix is referred to as "a mixed expression"). Conventionally, a mixed expression is displayed as a character string "1+MAT A*6" in a simplified manner. In other words, the matrix A cannot be displayed in a row-column format in the mixed expression. Only the calculated result is displayed in the row-column format as given by Expression (2).

$$= \begin{bmatrix} 13, 19 \\ 25, 31 \end{bmatrix} \quad (2)$$

As described above, the electronic device of the prior art displays a matrix in the conventional format during the input operation. Therefore, it is difficult for the operator to recognize which value corresponds to an element of the matrix during the input operation. As a result, since the input operation requires a long time, there exists a problem that many mistakes are easily made.

The calculated result or the like is displayed in the row-column format. However, if the size of the resulting matrix is larger than that of the screen portion 60, there is no symbol on the screen portion 60 for indicating that at least one element of the matrix is off the screen portion 60. Therefore, it is difficult for the operator to recognize which part of the entire matrix is displayed on the screen portion 60. Because the matrix cannot be displayed in the row-column format in the mixed expression during the input operation, the input operation is difficult and complicated, which prevents the electronic device from being improved in operability.

SUMMARY OF THE INVENTION

An electronic device for calculating and displaying a matrix of this invention, includes: a display section having a screen portion for displaying a matrix; and an inputting section for inputting commands into a control section, wherein the control section, after receiving a matrix generating command through the inputting section, controls a display of the matrix in a row-column format in which each element of the matrix has an initial value, the control section further receiving values of elements of the matrix through the inputting section, one of the elements being designated by a cursor on the screen portion.

In another example of the invention, an electronic device for calculating and displaying a matrix, includes: a display section having a screen portion for displaying a matrix in a row-column format; and a control section for indicating when the size of a matrix is larger than that of the screen portion by controlling a display of a symbol indicating that at least one element of the matrix is positioned off of the screen portion.

In still another example of the invention, an electronic device for calculating and displaying a matrix, includes: a display section having a screen portion for displaying a matrix and included in an expression; and an inputting section for inputting commands into a control section, wherein the control section, after receiving a command for evaluating an expression including a matrix through the inputting section, allows an operator to generate the matrix as a part of the expression, and controls a display of the matrix in a row-column format as a part of the expression in which each element of the matrix has an initial value, the control section further receiving values of elements of the matrix through the inputting section, one of the elements being designated by a cursor on the screen portion.

With the configuration as described above, a matrix whose elements are to be input is displayed in the row-column format on the screen portion. A positional information indicative of the position of a matrix element to be input is displayed as well as the size of the matrix. Therefore, the input and calculate operations can rapidly and surely be performed.

Thus, the invention described herein makes possible the advantages of (1) providing an electronic device for calculating and displaying a matrix by which an operation mistake can be prevented when inputting each value of elements of a matrix, thereby improving the operability of the device, (2) providing an electronic device for calculating and displaying a matrix by which, even when a matrix to be displayed is larger in size than a screen portion of a display apparatus, an operator can rapidly recognize which part of the matrix is currently being displayed, and (3) providing an electronic device for calculating and displaying a matrix which can display a matrix in a row-column format, even when the matrix is included in an expression.

These and other advantages of the present invention will become apparent to those skilled in the art upon reading and understanding the following detailed description with reference to the accompanying figures.

DESCRIPTION OF THE PREFERRED EMBODIMENTS

Figure 1:
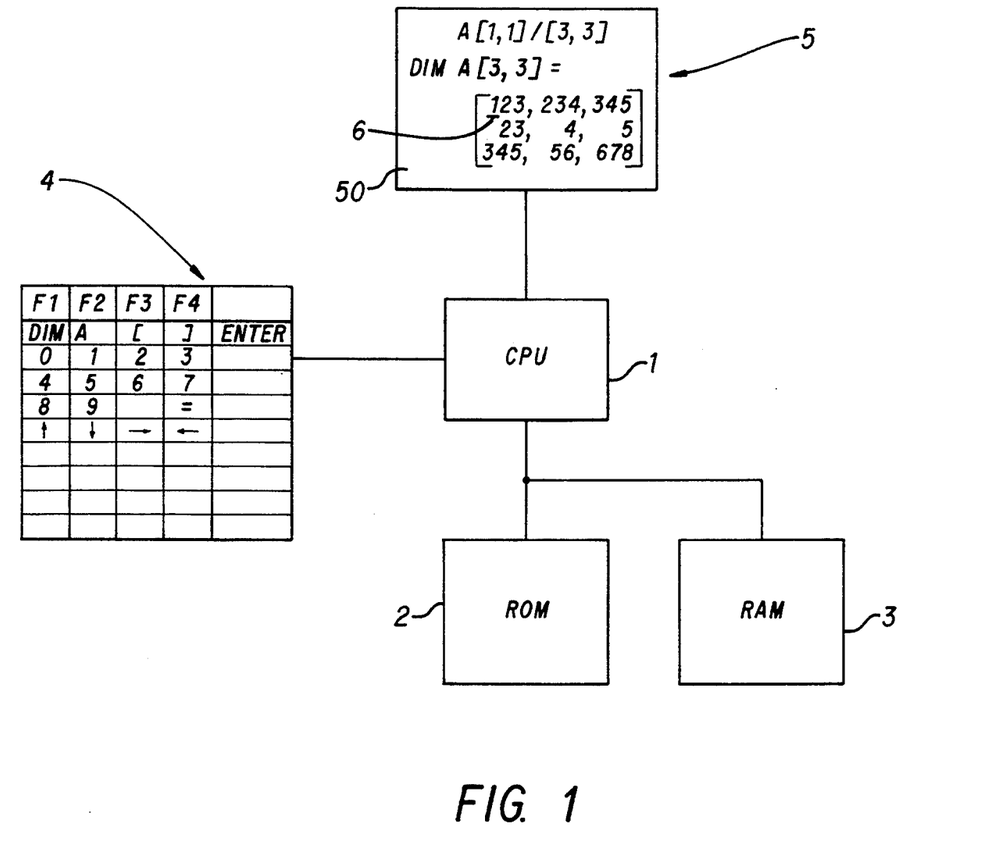
FIG. 1 is a block diagram showing a system configuration of an electronic device for calculating and displaying a matrix according to the invention.

FIG. 1 shows a system configuration of an electronic device for calculating and displaying a matrix according to the present invention. A CPU 1 serves as a control center of the electronic device, and performs various calculations such as a calculation of a matrix which is described below and various controls in accordance with control programs stored in a ROM 2. A keyboard 4 is connected to the CPU 1. The keyboard 4 includes various keys such as numeric keys and function keys. Data input by an operator from the keyboard 4 is stored in a RAM 3. The data stored in the RAM 3 is then read out and displayed on a screen portion 50 of a display apparatus 5.

Specifically, when a mode for inputting a matrix is selected by the operator using keys, a matrix is displayed in a two-dimensional row-column format on the screen portion 50 of the display apparatus 5, and a cursor 6 for designating one of elements is displayed, so that the operator can easily recognize the position of the element to be input, which will be described below in detail.

Figure 2:
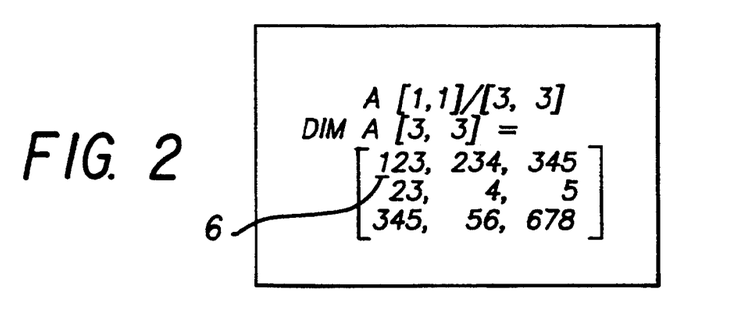
FIG. 2 illustrates an exemplary matrix displayed on a screen portion.

FIG. 2 shows an exemplary matrix displayed on the screen portion 50, according to the invention. In FIG. 2, a matrix A is displayed in the row-column format and a value of each element of the matrix A can be input by the operator. In the uppermost portion of the screen portion 50, a character string "A [1, 1]/[3, 3]" is displayed. The first bracket portion [1, 1] shows the positional information of an element as indicated by the cursor 6. In this example, it indicates the position of the first-row and first-column element. The second bracket portion [3, 3] shows the size of the matrix A. In this example, the matrix A has three rows and three columns.

Figure 3:
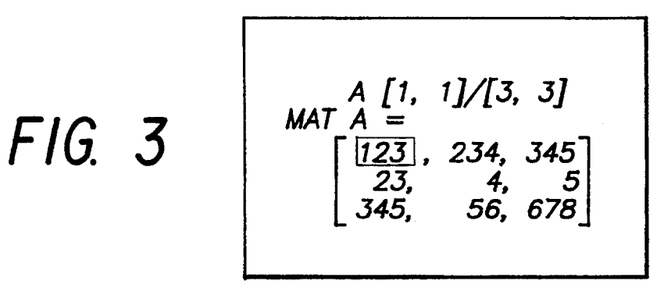
FIG. 3 illustrates an exemplary calculated result of the matrix A displayed on the screen portion.

FIG. 3 shows an exemplary calculated result of the matrix A displayed on the screen portion 50. In FIG. 3, the cursor 6 is not displayed, and instead the element indicated by the positional information is displayed in reverse video. In this example, the first-row and first-column element indicated by the positional information of [1, 1] is displayed in reverse video. In the uppermost portion of the screen portion 50, the positional information of the element and the matrix size are displayed, in the same way as in FIG. 2.

The actual display operation is performed under the control of the CPU 1 in accordance with the key operation of the operator. For example, the CPU 1 controls the display apparatus 5 via a control circuit (not shown) for controlling a voltage applied to the display apparatus 5, so as to achieve the display in reverse video on the screen portion 50.

Figure 4:
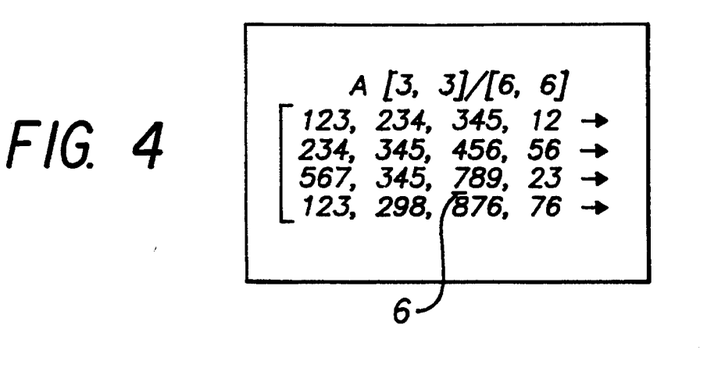
FIG. 4 illustrates an example of the matrix A displayed on the screen portion.
Figure 5:
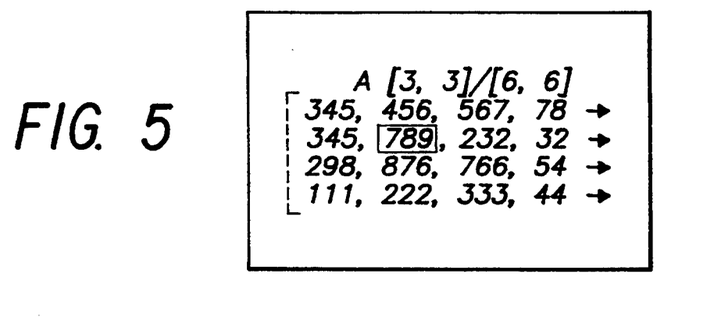
FIG. 5 illustrates an example of the matrix A displayed on the screen portion.

Moreover, according to the invention, when the size of a matrix is larger than that of the screen portion 50, and hence the matrix cannot be displayed on the screen portion 50 at the same time, the electronic device can indicate that at least one element of the matrix is off the screen. FIGS. 4 and 5 show two examples of the matrix A displayed on the screen portion 50, when some elements of the matrix A are off the screen. In the case where some elements of the matrix A are not displayed because they are off of the right side of the screen portion 50, an arrow → indicating such elements is displayed at the right end of each element row of the matrix A on the screen portion 50, as shown in FIGS. 4 and 5. Therefore, the operator is alerted to the fact and can easily recognize that some elements in the right portion of the matrix A are off the screen portion 50.

In another case where at least one element of the matrix A is positioned off of the upper, lower and left sides off the screen, for example, this state is indicated in a manner shown FIG. 5. Specifically, in FIG. 5, upper and lower bars displayed by broken line indicate that some elements of the matrix A are positioned off of the upper and lower sides of the screen 50. Similarly, a vertical bar of the left square bracket of the matrix A displayed by broken line indicates that some elements of the matrix A are positioned off of the left side of the screen portion 50. Therefore, the operator is alerted to the fact and can easily recognize that some elements in the upper, lower and left portions of the matrix A are positioned off of the screen portion 50.

Figure 6:
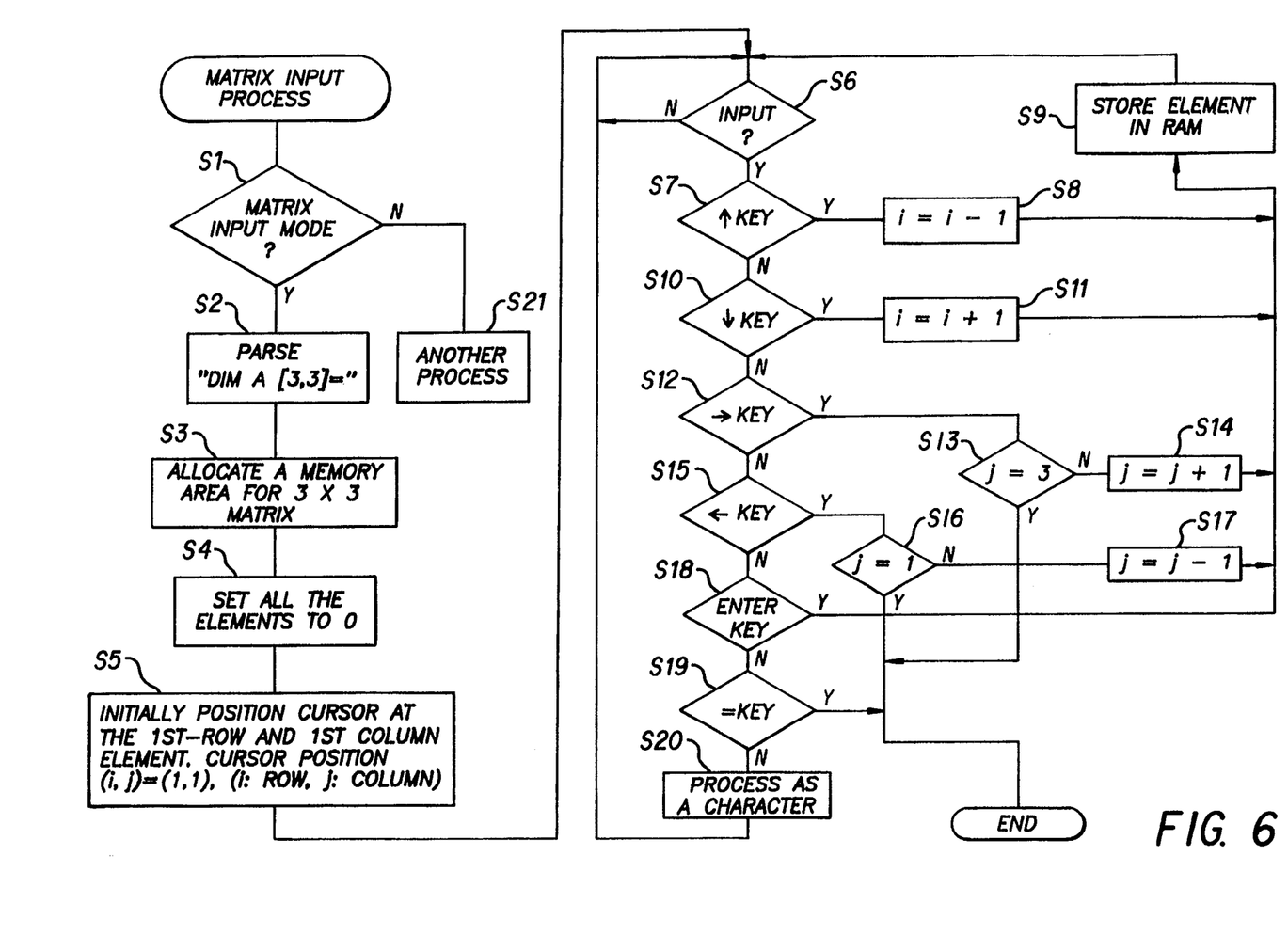
FIG. 6 is a flowchart illustrating an input process for inputting each value of elements of a matrix under the control of a CPU.

FIG. 6 shows an input process for inputting each value of elements of a matrix under the control of the CPU 1. A value of an element used herein may be a numeric value, an operator, an alphabet, or the like which can constitute a general expression. In this example, it is assumed that the matrix is a matrix A having a size of 3-row and 3-column. After a mode for inputting a matrix is selected by the key operation of the operator at step S1, the CPU 1 interprets a command "Dim A [3, 3] " which is input by the operator using keys at step S2.

The command "Dim A [3, 3]=" is actually input from the keyboard 4 in a key sequence of "Dim", "A", "[", "3", ",", "3", "]" and " ". The CPU 1 interprets the command and recognizes the meaning of the command as "Generate a matrix having a size of 3-row and 3-column and enter a mode for inputting a matrix".

When the CPU 1 interprets as described above in order to execute the command, a memory area of the RAM 3 is allocated for the matrix A of 3-row and 3-column at step S3. In step S4, all values of the elements of the matrix A in the memory area of the RAM 3 are initially set to be 0. The initialized value is read out from the RAM 3 and displayed on the screen portion 50. The cursor 6 is initially positioned at the first-row and first-column element on the screen portion 50 (step S5). The position of the cursor 6 is designated by (i, j), where i denotes a row number, and j denotes a column number.

Then, each value of the elements is sequentially input by the operator from the keyboard 4, starting with the first-row and first-column element (step S6). The CPU 1 is informed that the input value is determined by the depression of one of cursor keys " ↑ ", " ↓ ", "→", "←", (step S7, step S10, step S12, step S15) or a key "Enter" (step S18). When the CPU 1 is informed that the input value has been determined, the value is stored in the memory area of the RAM 3 (step S9), and displayed at the corresponding position on the screen portion 50. The process will be described below in detail.

When a value of the element indicated by the cursor 6 is input by the operator at step S6, it is judged whether or not the cursor key " ↑ " is depressed at step S7. If Yes, i is set to be i−1 at step S8, since the depression means that the cursor 6 is moved to a next-upper row. The input value is stored in the RAM 3 (step S9) and displayed at the corresponding position on the display apparatus 5. After step S9, the process returns to step S6, and the foregoing steps are repeated.

If, at step S7, it is judged that the cursor key " ↑ " is not depressed, it is judged whether the cursor key " ↓ " is depressed or not at step S10. If Yes, i is set to be i+1 at step S11, since the depression means that the cursor 6 is moved to a next-lower row. Then, the process of step S9 is executed.

If, at step S10, it is judged that the cursor key " ↓ " is not depressed, it is judged whether the cursor key "→" is depressed or not at step S12. If Yes, since the depression means that the cursor 6 is moved to a next-right column, it is judged whether j satisfies a condition of j=3 or not at step S13. If No, it means that values of all the elements of the matrix A have not yet been input. Therefore, in step S14, j is set to be j+1, and the process of step S9 is executed. If, at step S13, it is judged that j satisfies the condition of j=3, it means that values of all the elements of the matrix A have already been input. Therefore, the input process is terminated.

If, at step S12, it is judged that the cursor key "→" has not been depressed, it is judged whether the cursor key "←" has been depressed or not at step S15. If Yes, it is judged whether j satisfies a condition of j=1 or not at step S16. If Yes, it means that values of all the elements of the matrix A have already been input. Therefore, the input process is terminated. If No at step S16, j is set to be j−1, and the process of step S9 is executed.

If, at step S15, it is judged that the cursor key "←" is not depressed, it is judged whether the key "Enter" is depressed or not at step S18. If Yes, since the depression means that a value of one element is input, the process of step S9 is executed. Thereafter, the process returns to step S6.

If, at step S18, it is judged that the key "Enter" is not depressed, it is judged whether a key " " is depressed or not at step S19. The key " " is a instruction key which instructs the termination of the input process for the matrix A, after values of all the elements are input by depressing the cursor keys " ↑ ", " ↓ ", "→", "←" or depressing the key "Enter". In other words, the depression of the key " " defines the matrix A, and terminates the input process.

If, at step S19, it is judged that the key " " is not depressed, the input is processed as characters at step S20. Then, the process returns to step S6 where the CPU 1 waits for an input by the operator.

If, at step S1, it is judged that the mode for inputting a matrix is not selected, the process proceeds to step S21, where another process is executed.

In the above-mentioned example, the input process for inputting each value of elements of a matrix, i.e., the process of generating a new matrix A is described. In addition, the electronic device of the invention can modify a value of each element of the matrix A which is already stored in the RAM 3. In order to generate a new matrix A, the command "Dim A [3, 3] " is required to be input by the keys. In order to modify a value of each element of the matrix A, a command "Dim A [] " without the size of the matrix A is required to be input by the keys. The command is actually input in a key sequence of "Dim", "A", "[", "]", and " ". When the command is input, values of the elements of the matrix A which are already stored in the memory area of the RAM 3 are read out and displayed on the screen portion 50. Then, the processes of step S5 and the foregoing steps are executed, thereby modifying the value of each element.

Figure 7:
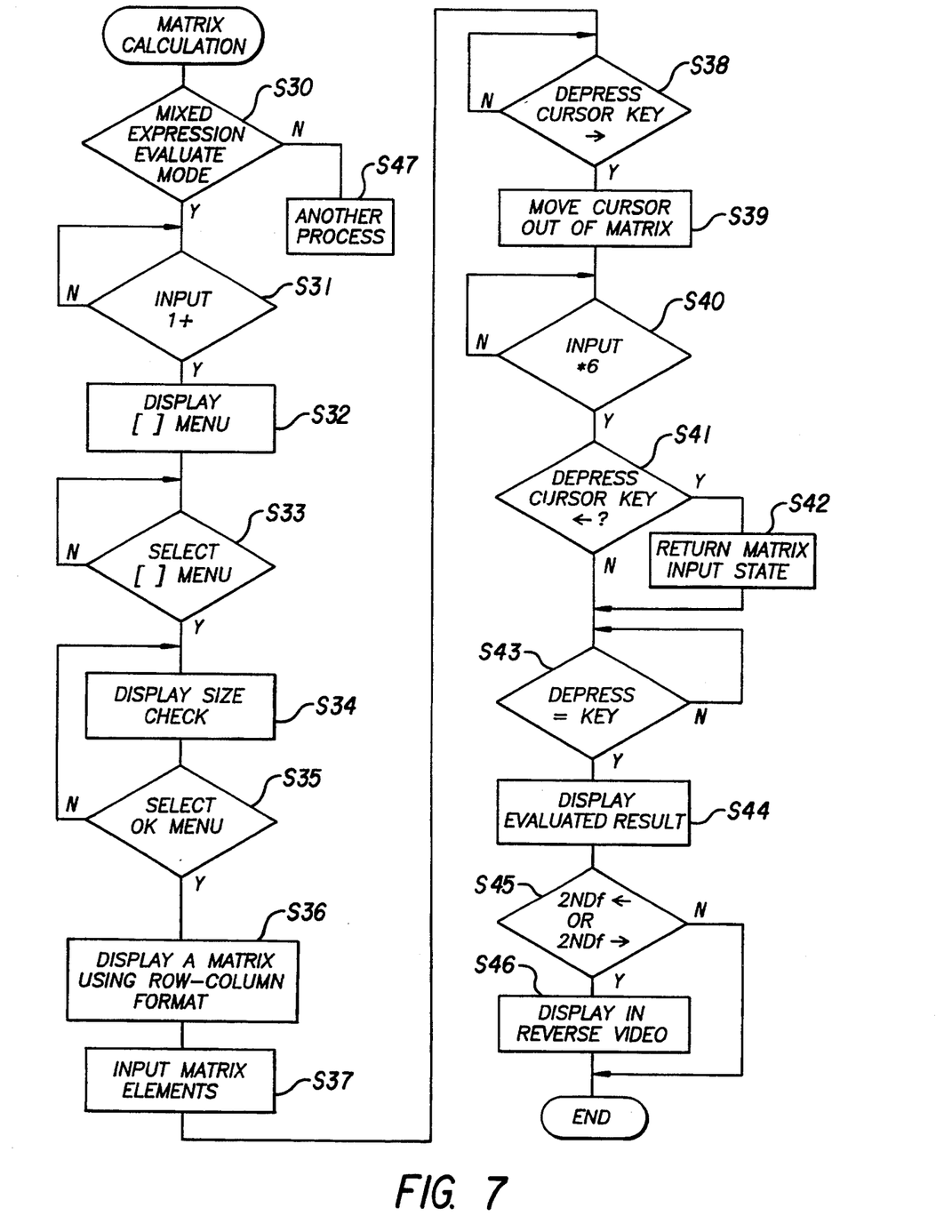
FIG. 7 is a flowchart illustrating an evaluation process for evaluating a mixed expression under the control of the CPU.

FIG. 7 shows an evaluation process for evaluating a mixed expression under the control of the CPU 1. In this example, the mixed expression includes the matrix A and a general expression, such as Expression (3) below.

$$1 + \begin{bmatrix} 2, 3 \\ 4, 5 \end{bmatrix} * 6 \tag{3}$$

Figure 8:
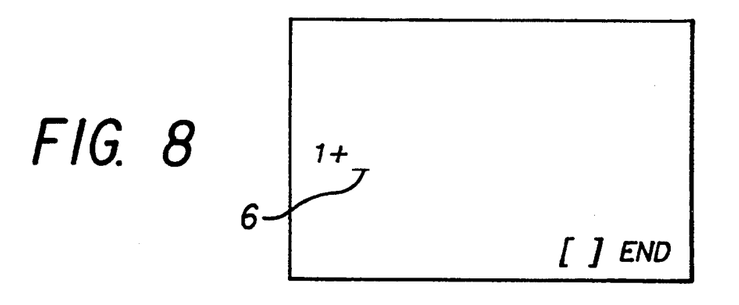
FIG. 8 illustrates part of an exemplary mixed expression displayed on the screen portion.
Figure 9:
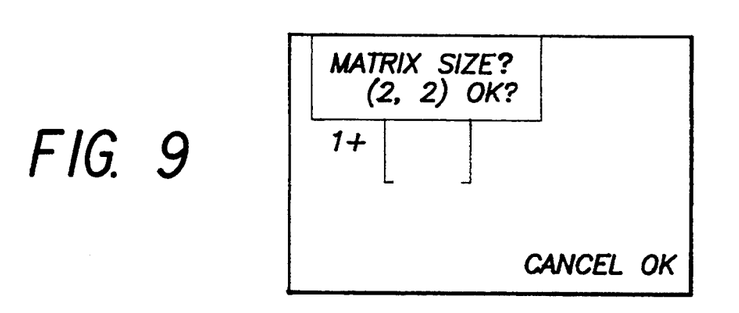
FIG. 9 illustrates an exemplary message displayed on the screen portion.

When it is verified at step S30 that a mode for evaluating a mixed expression is selected, the CPU 1 waits for the former expression "1+" to be input by the operator at step S31. When the former expression is input, the input data is stored in a memory area of the RAM 3. The former expression "1+" is displayed on the screen portion 50, as shown in FIG. 8. At this time, a menu of matrix brackets "[]" is displayed in a menu display portion which is the lowest portion of the screen portion 50 so as to allow the operator to select it (S32). If the menu "[]" is selected (S33), a message "Matrix size ? (2, 2) OK ?" is displayed in the uppermost portion of the screen portion 50 in order to ask the size of a matrix to be input (S34), as shown in FIG. 9. At this time, in the menu display portion, a menu "Cancel" and a menu "OK" are displayed, as shown in FIG. 9. The menu "Cancel" is used for canceling the displayed matrix size and for selecting one of other matrix sizes. The menu "OK" is used for selecting the displayed matrix size.

Figure 10:
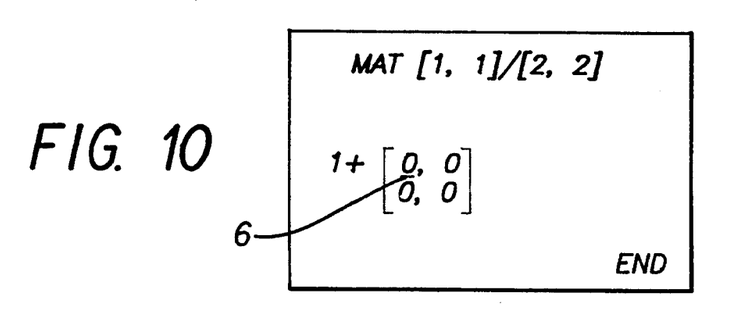
FIG. 10 illustrates part of an exemplary mixed expression displayed on the screen portion.

If, at step S35, the menu "OK" is selected, a matrix having a size of 2-row and 2-column is displayed on the right side of the former expression "1+" (S36), as shown in FIG. 10. In FIG. 10, all values of elements of the matrix A are set to be 0. At this time, a memory area of the RAM 3 is allocated for storing the matrix having a size of 2-row and 2-column. In the uppermost portion of the screen portion 50, a positional information [1, 1] indicating the position of an element designated by the cursor 6 and a matrix size [2, 2] are displayed.

Figure 11:
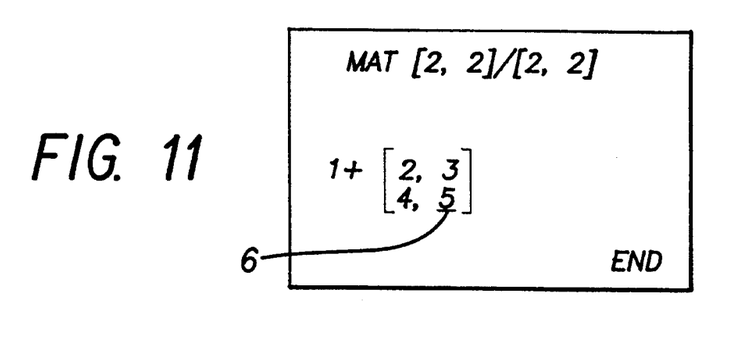
FIG. 11 illustrates part of an exemplary mixed expression displayed on the screen portion.

In step S37, a subroutine for inputting each value of elements of a matrix is executed. The subroutine is substantially the same process as that shown in FIG. 6. The input values are stored in the RAM 3 and displayed on the screen portion 50, as shown in FIG. 11.

Figure 12:
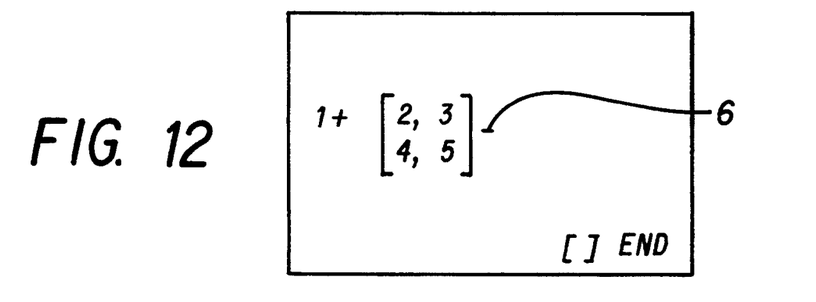
FIG. 12 illustrates part of an exemplary mixed expression displayed on the screen portion.

After inputting values of all the elements of the matrix A having a size of 2-row and 2-column in step S37, the depression of the cursor key "→" is awaited at step S38. If the "→" key is depressed, the cursor 6 is moved out of the matrix brackets (S39), as shown in FIG. 12. By this movement of the cursor 6, the mode for inputting a matrix is automatically terminated. Thereafter, an expression after the matrix brackets can be input and edited. Specifically, a process for inputting the latter expression "* 6" after the matrix A is executed.

Figure 13:
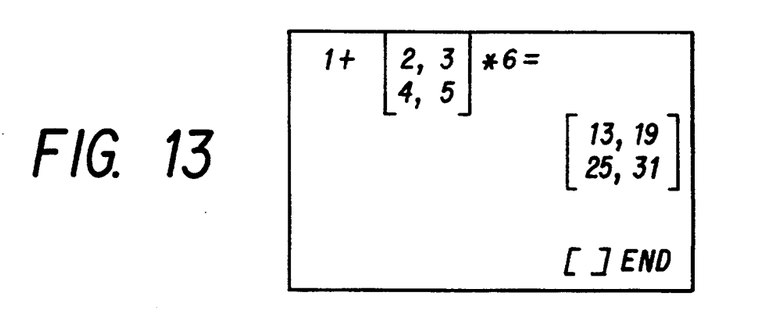
FIG. 13 illustrates an exemplary mixed expression and the evaluated result displayed on the screen portion.

In the step S40, the input of the latter expression "* 6" is awaited. If the expression is input, it is judged whether the cursor key "←" is depressed or not at step S41. If the key is not depressed, it is judged whether the key " " is depressed or not at step S43. If Yes at step S43, the mixed expression which is input so far is evaluated, and the result is displayed on the screen portion 50 (step S44), as shown in FIG. 13.

Figure 14:
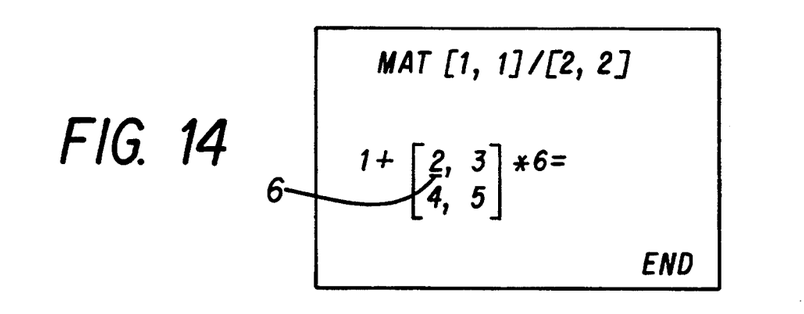
FIG. 14 illustrates an exemplary mixed expression displayed on the screen portion.

If, at step S41, it is judged that the cursor key "←" is depressed, the electronic device returns to the mode for inputting a matrix (step S42). FIG. 14 shows an exemplary display on the screen portion 50 at this time. If the key " " is depressed (step S43), the mixed expression is evaluated, and the evaluated result is displayed on the screen portion 50 (step S44).

Figure 15:
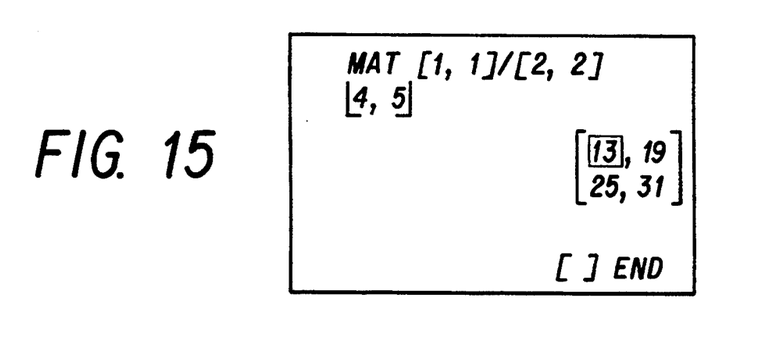
FIG. 15 illustrates an exemplary calculated result of the mixed expression displayed on the screen portion.

If a key "2ndf←" or a key "2ndf→" is depressed while the result is being displayed at step S45, the first-row and first-column element of the resulting matrix is displayed in reverse video at step S46 as in FIG. 15. As the cursor 6 is moved, the matrix element corresponding to the moved position of the cursor 6 is displayed in reverse video.

If, at step S30, the mode for evaluating a mixed expression is not selected, the process proceeds to step S47 where another process is executed.

Accordingly, with the electronic device for calculating and displaying a matrix as described, a matrix can be displayed in the row-column format, and the positional information of a matrix element designated and the matrix size are displayed on the screen portion. Therefore, the input process for inputting each value of elements of a matrix and the evaluation process for evaluating a mixed expression can be rapidly and surely executed, whereby the operability of the electronic device is greatly improved. Furthermore, even if a matrix has a larger size than that of the screen portion of the display apparatus, various symbols are displayed on the screen portion so as to indicate that at least one element of the matrix is off of the screen. Therefore, the operator can rapidly and surely know which elements of the matrix are displayed on the screen, whereby the operability of the electronic device is greatly improved. Also, when a mixed expression is to be input and displayed, the matrix can be displayed in the row-column format.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electronic device for calculating and displaying a matrix, comprising:
   display means including a screen portion for displaying a matrix; and
   inputting means for inputting commands into a control means;
   wherein said control means, after receiving a matrix generating command through said inputting means, controls the display of said matrix in a two-dimensional row-column format in which each element of said matrix has an initial value, said control means further receiving values of elements of said matrix through said inputting means, and wherein one of said elements is designated by a cursor on said screen portion.

2. An electronic device according to claim 1, said electronic device further comprising memory means for storing said matrix, wherein said control means further allocates a memory area in said memory means and stores values of elements of said matrix into said memory area of said memory means.

3. An electronic device according to claim 2, wherein said memory means includes a RAM.

4. An electronic device according to claim 1, wherein said control means includes a CPU.

5. An electronic device for calculating and displaying a matrix, comprising:
   display means including a screen portion for displaying a matrix in a two-dimensional row-column format; and
   control means for, when the size of a matrix is larger than that of said screen portion, controlling a display of a symbol indicating that at least one element of said matrix is positioned off of said screen portion.

6. An electronic device according to claim 5, wherein said display means further displays positional information indicative of an element of said matrix and further displays information indicative of the size of said matrix.

7. An electronic device according to claim 5, wherein said control means controls a display of a symbol which indicates a direction in which at least one element of said matrix is positioned off of said screen portion.

8. An electronic device according to claim 5, wherein said control means includes a CPU.

9. An electronic device for calculating and displaying a matrix, comprising:
   display means including a screen portion for displaying a matrix and an expression; and
   inputting means for inputting commands into a control means,
   wherein said control means, after receiving a command for evaluating an expression including a matrix through said inputting means, allows an operator to generate said matrix as a part of said expression, and controls the display of said matrix in a two-dimensional row-column format as a part of said expression in which each element of said matrix has an initial value, said control means further receiving values of elements of said matrix through said inputting means, and wherein one of said elements is designated by a cursor on said screen portion.

10. An electronic device according to claim 9, said electronic device further comprising a memory means for storing said matrix, wherein said control means further allocates a memory area in said memory means and stores values of elements of said matrix into said memory area of said memory means.

11. An electronic device according to claim 10, wherein said memory means includes a RAM.

12. An electronic device according to claim 9, wherein said control means further moves said cursor according to a command received through said inputting means, and allows input of a value of an element only when said cursor is positioned within brackets of said matrix displayed in a row-column format.

13. An electronic device according to claim 9, wherein said control means includes a CPU.

14. An electronic device for calculating and displaying a matrix, comprising:
 display means including a screen portion for displaying a matrix and an expression; and
 inputting means for inputting commands into control means,
 wherein said control means, after receiving a command for generating an expression including a matrix through said inputting means, allows an operator to generate said expression including a matrix, and controls the display of said matrix in a two-dimensional row-column format as a part of said expression in which each element of said matrix has an initial value, said control means further receiving values of elements of said matrix through said inputting means, one of said elements being designated by a cursor on said screen portion, said control means further receiving a command for evaluating said expression including said matrix, so as to evaluate said expression including said matrix, and display the result of the evaluation on said screen portion.

* * * * *